United States Patent [19]

Clausmeyer et al.

[11] Patent Number: 5,533,770
[45] Date of Patent: Jul. 9, 1996

US005533770A

[54] HIGH-STRENGTH SOLID WHEELS AND TIRES FOR RAILROAD TRACTION VEHICLES AND CARS

[75] Inventors: Horst Clausmeyer, Dinslaken; Dieter Hoffmann, Hamminkeln; Wolfgang Weber, Oberhausen, all of Germany

[73] Assignee: MAN Gutehoffnungshütte Aktiengesellschaft, Oberhausen, Germany

[21] Appl. No.: 244,703

[22] PCT Filed: Sep. 22, 1993

[86] PCT No.: PCT/EP93/02561

§ 371 Date: Jun. 30, 1994

§ 102(e) Date: Jun. 30, 1994

[87] PCT Pub. No.: WO94/09171

PCT Pub. Date: Apr. 28, 1994

[30] Foreign Application Priority Data

Oct. 10, 1992 [DE] Germany .................... 42 34 192.2

[51] Int. Cl.⁶ .................................................. B60B 17/00
[52] U.S. Cl. ................... 295/1; 148/583; 148/662; 148/335
[58] Field of Search ................... 295/1, 8, 21, 29, 295/30, 31.1; 148/581, 583, 335, 662; 420/108, 128

[56] References Cited

U.S. PATENT DOCUMENTS

| | | | |
|---|---|---|---|
| 2,129,671 | 9/1938 | Brunner | 148/583 |
| 2,197,365 | 4/1940 | Kjerrman | 148/662 X |
| 2,368,418 | 1/1945 | McCarroll et al. | 148/662 |
| 3,009,844 | 11/1961 | Connert | 148/662 |
| 3,135,600 | 6/1964 | Hardwick et al. | 148/662 X |
| 3,163,565 | 12/1964 | Wada | 148/662 X |
| 4,861,549 | 8/1989 | Khare | 148/335 X |

FOREIGN PATENT DOCUMENTS 2309531  9/1973  Germany .................... 148/583

*Primary Examiner*—Russell D. Stormer
*Attorney, Agent, or Firm*—Max Fogiel

[57] ABSTRACT

A steel for high-strength solid wheels and tires for railroad traction vehicles and cars that is more tenacious at the strengths typical of existing steels, and that is less likely to fracture even at constant braking. The steel has a specific ratio between major, alloying and companion elements, so that the steel is of high purity and uniformity. The heat treatment ensures a structure of excellent tenacity at high strength and of special endurance.

3 Claims, No Drawings

HIGH-STRENGTH SOLID WHEELS AND TIRES FOR RAILROAD TRACTION VEHICLES AND CARS

BACKGROUND OF THE INVENTION

The present invention concerns high-strength solid wheels and tires of forged and rolled alloyed steel, quenched and tempered, for railroad traction vehicles and cars.

Solid wheels and tires for railroad vehicles have previously been made of steel containing 0.48 to 0.52% carbon and 0.75 to 0.80% manganese as determined in accordance with UIC Code 812- 3/V, 5th edition, Jan. 1, 1984.

The most practical steel is steel R7. Its tensile strength (Rm) is 820 to 940 N/mm$^2$, its break elongation ($A_5$) at least 14%, and its notch-impact work at least 15 Nm in ISO U sections. All these levels are for 20° C. (room temperature).

Steel R7 is preferably employed for block-braked solid wheels in cars with high axle loads.

From known wheel fractures and from the research into their etiologies conducted on specific steels it has been concluded that one cause of UIC-Code steel breakage is insufficient tenacity.

High-speed trains are also equipped with wheels of UIC Code 812-3/V Steel R7. More rigid specifications deriving from heavier axle loads, higher speeds, and greater braking forces, especially in conjunction with the constant braking that occurs in mountainous regions, can also lead to wheel fracture.

SUMMARY OF THE INVENTION

The object of the present invention is accordingly a steel for high-strength solid wheels and tires for railroad traction vehicles and cars that will be much more tenacious at the strengths typical of existing steels, R7 for example, and that will be less likely to fracture even at constant braking.

This object is attained in accordance with the present invention as recited in the claims.

A steel with a specific ratio between major, alloying, and companion elements will be a steel of high purity and uniformity. Furthermore, the heat treatment in accordance with the present invention ensures a structure of excellent tenacity at high strength and of especially endurance.

DESCRIPTION OF THE PREFERRED EMBODIMENTS

The invention accordingly concerns specifying an innovative material for solid wheels and tires for railroad vehicles along with a heat treatment for solid wheels and tires of that material.

Compositions are provided with specific ratios of carbon to chromium to nickel, with specific upper thresholds of silicon, and with particularly low upper thresholds of phosphorus and sulfur that will subsequent to quenching and tempering yield steels for solid wheels and tires with strengths equal to or surpassing those of the Steel R7 predominantly employed today and with on the other hand far superior tenacities, especially break tenacities. These compositions are as follows:

| | |
|---|---|
| carbon: | 0.380–0.420 |
| silicon: | ≦0.250 |
| manganese: | 0.400–0.600 |
| phosphorus: | ≦0.012 |
| sulfur: | ≦0.005 |
| chromium: | 1.000–1.500 |
| molybdenum: | 0.300–0.600 |
| nickel: | 0.700–1.200 |
| aluminum: | 0.015–0.040 |
| nitrogen | ≦0.008. |

In the preceding composition of the steel, the ranges of chromium, molybdenum, and nickel can, furthermore, be changed to the following, in percent by mass:

| | |
|---|---|
| chromium: | 1.00–1.30 |
| molybdenum: | 0.30–0.50 |
| nickel: | 0.70–1.00. |

Temperatures and cooling procedures are provided for quenching and tempering that will ensure such superior tenacities and provide the wheels and tires with minimal strengths similar to those specified in the UIC Code 812-3/V for Steel R7. These temperatures and cooling procedures are as follows:

hardening at 850° to 900° C. followed by quenching in water or oil at room temperature at approximately 20° C.;

and annealing at 600° to 680° C. followed by slow cooling in air to room temperature at approximately 20° C.

The tenacities of the ferrite-perlite carbon-manganese steels previously known from UIC Code 812-3/V cannot be much improved. Steel composition accordingly needs thoroughgoing revision, with due attention of course to purity, homogeneity, and maximal isotropy. Acceptable break tenacities accordingly necessitate, in departure from the ferrite-perlites while retaining the minimal requisite tensile-strength levels, a steel of good quenching and tempering all the way through with a fine crystalline and homogeneous quench structure. Specific proportions of stable carbides have a positive effect on sensitivity to burning. The desired long-term rolling strength and resistance to fatigue can be attained with the right combination of structure, strength, and tenacity. This can be derived from the chemistry of the present invention and from its specially associated heat treatment.

As much as 1.50% chromium, 0.60% molybdenum, and 1.20% nickel by mass can be tolerated in the alloy.

The sequence of quenching followed by tempering is basically known. In particular, it improves tenacities at specific strengths. The particular heat treatment of the wheels and tires also contributes to roll-out properties, fatigue resistance, and to resistance to burning on the part of the finished wheel and tire. Attention must accordingly be paid to ensuring high enough temperatures in the homogeneous gamma mixed-crystal phase, to precipitous chilling, preferably in water, from hardening temperature, and to subsequent heating to relatively high annealing temperatures. The following specifications should be adhered to.

Hardening at 850° to 950° C. followed by quenching in water or oil at room temperature (approximately 20° C.)

and annealing at 600° to 680° C. followed by slow cooling in air to room temperature (approximately 20° C.).

Since determining the precise heat-treatment parameters for each specific case must also take the dimensions of the component into account, the foregoing figures may vary slightly.

The room-temperature mechanical and engineering properties of the material in accordance with the present invention subsequent to heat treatment should be yield strength $R_{Po.2}$: $\geq 590$ N/mm$^2$
tensile strength Rm: $\geq 850$ N/mm$^2$
break elongation $A_5$: $\geq 16\%$
notch-impact work (ISO V section) $A_v$: $\geq 34$ Nm
break tenacity $K_{Ic}$: $\geq 100$ MNm$^{-3/2}$.

Notch-impact work in the shallow $A_{VH}$ level should be at least 65 Nm at a temperature that has not yet been determined.

We claim:

1. High-strength solid wheels and tires of forged and rolled alloyed steel, quenched and tempered, for railroad traction vehicles and cars, said steel comprising, in percent by mass, of

| | |
|---|---|
| carbon: | 0.380–0.420 |
| silicon: | $\leq 0.250$ |
| manganese: | 0.400–0.600 |
| phosphorus: | $\leq 0.012$ |
| sulfur: | $\leq 0.005$ |
| chromium: | 1.000–1.500 |
| molybdenum: | 0.300–0.600 |
| nickel: | 0.700–1.200 |
| aluminum: | 0.015–0.040 |
| nitrogen | $\leq 0.008$. |

2. Solid wheels and tires as defined in claim 1, wherein said steel comprises further, in percent by mass, of

| | |
|---|---|
| chromium: | 1.00–1.30 |
| molybdenum: | 0.30–0.50 |
| nickel: | 0.70–1.00. |

3. A method of heat treating solid wheels and tires of the steel defined in claim 1 for total quenching and tempering comprising the steps of:

hardening at 850° to 900° C. followed by quenching in water or oil at room temperature at approximately 20° C.;

and annealing at 600° to 680° C. followed by slow cooling in air to room temperature at approximately 20° C.

* * * * *